Nov. 12, 1963 J. M. DENNEY ETAL 3,110,806
SOLID STATE RADIATION DETECTOR WITH WIDE DEPLETION REGION
Filed May 29, 1959

Joseph M. Denney,
Stephen S. Friedland,
Frank Keywell,
INVENTORS.
BY.

ATTORNEY.

3,110,806
SOLID STATE RADIATION DETECTOR WITH
WIDE DEPLETION REGION
Joseph M. Denney, Palos Verdes, Stephen S. Friedland,
Sherman Oaks, and Frank Keywell, Santa Ana, Calif.,
assignors to Hughes Aircraft Company, Culver City,
Calif., a corporation of Delaware
Filed May 29, 1959, Ser. No. 816,825
2 Claims. (Cl. 250—83.3)

This invention relates to the detection of charged nuclear particles. More particularly, the invention relates to methods and apparatus for detecting the presence and number of charged particles such as proton, alphas and fission fragments and beta particles.

The detection of nuclear radiation may be achieved by many methods which are well known. Among the various systems utilized to detect and count charged particles are ionization chambers, Geiger-Muller counters, proportional counters, and scintillation detectors. Other detectors have been suggested some of which are in use for various applications. Among these are photographic emulsion techniques, cloud chambers, crystal counters and Cerenkov detectors. Chemical dosimeters have also been proposed which will measure the amount of energy absorbed but will not indicate the number of particles absorbed or the rate of absorption. A rather complete discussion of the various means and apparatus employed to date for the detection of nuclear radiation is set forth in the text "Nuclear Radiation Detection" by W. J. Price, McGraw-Hill Book Company (1958).

It will be noted that practically all of the radiation detectors currently in use rely on the mechanisms of gas ionization or chemical changes produced by the nuclear particles. B. Cassen ("Proceedings of the International Conference on the Peaceful Uses of Atomic Energy," volume 14, page 218, United Nations, New York, 1956) has suggested the employment of single crystals of intrinsic germanium for fast neutron dosimetric detectors. Aside from this work very little has been done in the field of radiation detection by means of semiconductor materials. In 1949 C. G. McKay reported a germanium counter comprising a phosphor-bronze point contact on the face of a piece of N-type high back voltage germanium. (Physical Review, volume 76, page 1537.) McKay's counter is operated with the point biased negatively with respect to the germanium. The resulting barrier region apparently was the only region found sensitive to the impingement of alpha particles. McKay reports the diameter of between $10^{-3}$ and $10^{-2}$ cm. for the sensitive region. It was also suggested that the sensitive area could be increased by using a P-N junction, at least in one dimension (lengthwise). However, it is further noted in McKay's article that the maximum area is subject to restrictions, the principal one being an adequate signal-to-noise ratio. Obvious disadvantages of this device for radiation detection are the smallness of the sensitive area and the identification thereof (since the sensitive region is not readily observable).

In order to avoid the disadvantages of the McKay germanium counter, particularly the extreme smallness of the radiation-sensitive region, other workers suggested gold-germanium surface barriers for alpha particle counting. Thus J. Mayer and B. Gossick (Review of Scientific Instruments, volume 27, page 407, 1956) describe a counter employing a germanium body having a thin coating of gold on one face. However, great difficulty has been encountered in obtaining reproducibility in the characteristics from one device to another. One other disadvantage is the excessive susceptibility to thermal noise which is so characteristic of surface-barrier devices. In fact all of the semiconductor-type detectors suggested to date must be operated at extremely low temperatures (i.e., that of liquid nitrogen) to avoid thermal noise effects from obliterating or masking useful signals derived from the impingement of charged particles. Price (page 230, supra), for example, reports that measurements with Cassen's device must be made at a reduced temperature, usually that of solid carbon dioxide, for maximum sensitivity.

That semiconductor devices have marked utility in the field of radiation detection in comparison with the prior art devices such as ionization chambers and the like cannot be doubted. For one thing semiconductor-type radiation detectors can be made small enough for injection beneath the skin by a hypodermic needle whereby extremely accurate control of the radiation treatment for cancerous tumors and the like can be obtained. Furthermore, the semiconductor-type detectors to be described hereinafter are mechanically rugged and require low operating potentials, have an absence of windows and vacuum and have a fast response time in comparison with Geiger-Muller counters and other gas-ionization type detectors. The chief disadvantage of the semiconductor radiation detectors proposed heretofore, however, lies in the requirement of operation at extremely low temperatures in order to avoid the thermal noise effects.

It is therefore an object of the present invention to provide a charged particle radiation detector of a semiconductor type which may be operated at ambient temperatures.

This and other objects and advantages of the invention are realized by providing a single crystal semiconductor body of silicon having a P-N junction therein and a sensitive area located near one face of the body whereby substantially all of the ionization resulting from the penetration of charged particles into the semiconductor body occurs near the sensitive area.

The invention will be described in greater detail by reference to the drawings in which.

Figure 1:
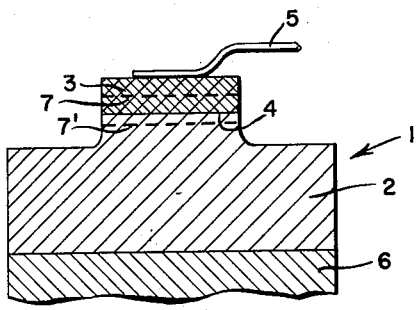
FIG. 1 is an elevational view in section of a semiconductor radiation detector according to the invention.

Referring now to FIG. 1, the semiconductor radiation detector of the invention comprises a wafer 1 of silicon, the major portion 2 of which is of P-type conductivity. It will be appreciated that the sizes and proportions shown in the drawings are greatly exaggerated for purposes of clarity and facility of explanation. Actually, typical dimensions may be as follows: the wafer may be about $\frac{1}{16}''$ in thickness and $\frac{1}{4}''$ in diameter, with the plateau region being about $\frac{1}{32}''$ in diameter and about 2 mils high. The silicon wafer is preferably of single crystalline structure. The wafer 1 includes also a region 3 of N-type conductivity adjacent the P-type region 2 whereby a rectifying junction 4 is formed between the two regions of opposite conductivity. The manufacture and preparation of such devices are well understood in the art and will not be described in detail. The P-type conductivity may be imparted to the silicon wafer by "doping" with an impurity agent such as boron, aluminum, gallium, or indium. N-type conductivity may be established by "doping" with phosphorous, arsenic, or antimony, for example. A preferred embodiment of the device is shown wherein a small plateau or mesa is established on a surface of a silicon wafer with the N-type region 3 provided in the plateau. Such a construction may be achieved by starting with a P-type silicon wafer which has arsenic, for example, diffused into one surface thereof. Thereafter, the area desired for the plateau is masked. The exposed area, not under the mask, is then etched so that all of the exposed N-type region and the portions of the P-type material under the exposed N-type regions are removed. Such a process results in the plateau-like configuration shown. The contact to the N-type region 3 is then made by pressing a Phosphor-bronze wire 5 thereto. Likewise, an ohmic contact is provided to the P-type region 2 by soldering the wafer to a metallic plug 6, of brass, for example. This ohmic contact may be achieved by electrolytically plating nickel onto the surface of the P-type silicon 2 and then employing tin solder to secure the ohmic and mechanical connection to the brass plug 6.

As is well known in the operation of P-N junction devices, the application of a reverse bias across the P-N junction, as by connecting the P-type silicon 2 to the negative terminal of a power supply, results in the establishment of what is more commonly called a depletion region adjacent the junction. In effect, a reverse bias causes the regions on either side of the rectifying junction to be depleted of any charge carriers by the establishment of an electric field across the junction. The depletion region in the device of the invention is shown by the dashed lines 7—7'. The width of the depletion region is dependent upon the resistivity of the N and P type regions on either side of the junction and on the magnitude of the applied reverse voltage. These relationships are expressed according to the following formula:

$$d = A\sqrt{V\frac{b}{C_n} + \frac{1}{C_p}}$$

Where $V=$ the direct voltage across the junction, $C_n=$ the conductivity of the N-type region, $C_p=$ the conductivity of the P-type region, and A and B are constants. It will be appreciated that the depletion region extends mostly into either the N or P type conductivity regions where the conductivity is lowest. Furthermore, while the width of the depletion region is variable within a given range of biasing voltages, there is a maximum voltage which, if exceeded, results in "avalanching" or breakdown.

It is known that when an alpha particle, for example, penetrates a mass of material, the interaction of the Coulomb fields of the particle with those of the bound electrons of the mass of material results in an energy loss. This phenomenon is sometimes called excitation and/or ionization of the atoms. It will be appreciated that the energy loss or transfer by ionization decreases per unit of thickness of the absorbing mass. For example, a 5.0 mev. proton particle loses substantially all of its energy by ionization by a penetration of $2.06 \times 10^{-2}$ cm. in silicon. On the other hand, a 10 mev. proton particle loses substantially all of its energy by ionization with a penetration of $6.9 \times 10^{-2}$ cm. in silicon. Accordingly, it is a feature of the invention to so establish the width of the depletion region to permit substantially all of the ionization resulting from penetration of charged particles into the silicon wafer to occur within the depletion region.

With these principles in mind, the device shown in FIG. 1 is so constructed as to have the following geometry and dimensions. The junction 4 may be about $1 \times 10^{-4}$ cm. beneath the surface of the wafer. Furthermore, the width of the depletion region may be about $2 \times 10^{-4}$ cm. It will be appreciated that these parameters are relatively easily obtainable by varying the resistivity of the N- and P-type regions, by properly locating the P-N junction, and by controlling the magnitude of the biasing voltage. With such an arrangement substantially all of the energy losses of charged particles entering the wafer occurs within the depletion region and the electron-hole pairs established thereby result in the generation of a pulse of current. A typical embodiment of a detector according to the invention having the parameters described above was operated with a bias of 5 volts at room temperature and alpha particles of 5.6 mev. energy were detected as pulses whose height was substantially independent of the bias voltage. The height of the pulses measured was related to the particle energy within 2%.

Figure 2:
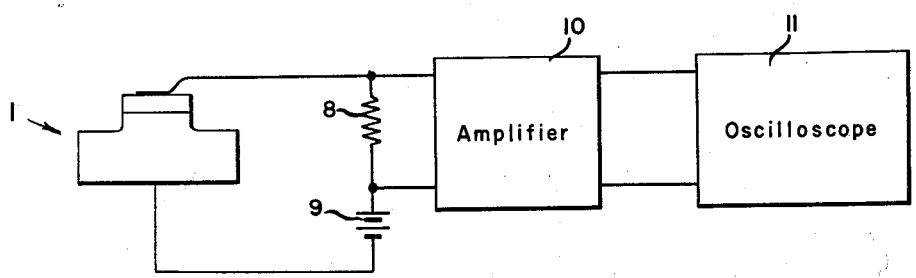
FIG. 2 is a partially schematic diagram of the semiconductor radiation detector and a circuit including apparatus whereby the pulses produced by the detector may be counted or otherwise displaced.

Referring now to FIG. 2, an arrangement for detecting and/or counting charged particles is shown. The semiconductor junction detector 1 is connected in series fashion with a resistor 8 and a battery 9. The pulses appearing across the P-N junction due to the penetration of charged particles into the wafer may be applied to an amplifier 10 and displayed on an oscilloscope 11 as shown. It will be appreciated that other means for counting and detecting the presence of the pulses due to absorbed radiation are readily within the skill of the art. For example, the oscilloscope might be replaced with a device such as a scaler which will convert the pulses into an ultimate signal, or a dial type counter could be employed in the same manner.

Figure 3:
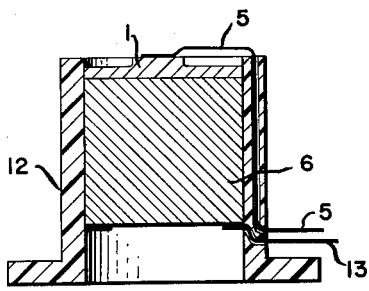
FIG. 3 is an elevational view in section of a typical packaged semiconductor radiation detector according to the invention.

FIG. 3 typically shows a completely assembled radiation detector according to the invention. The silicon wafer 1 is mounted as described previously on the end of a relatively massive brass plug 6. The phosphor-bronze contact to the N-type mesa region is also provided as before. The assembly comprising the wafer 1 and the brass plug 6 are then inserted in an insulating envelope which may be a hollow cylinder of plastic material such as polystyrene or the like. The emitter electrode 5 is embedded in the wall of the insulating envelope and brought out at any convenient point. A lead 13 of copper, for example, is likewise passed through the envelope 12 and soldered to an exposed surface of the brass plug 6. Having thus described my invention, what is claimed is:

1. A method of detecting charged particle radiation, which comprises: exposing a semiconductor crystal body, having a PN junction therein parallel and adjacent to a given surface thereof, to charged particle radiation over said surface whereby said particles penetrate the body toward said junction; applying electrical bias to the PN junction in the reverse direction to establish an electrical field about the junction and define in the body a depletion region of sufficient width to capture substantially all of the ionization produced in said body; and detecting current pulses appearing across the PN junction due to penetration of charged particles into the depletion region.

2. A method of detecting charged particle radiation, which comprises: exposing a semiconductor crystal body, having a PN junction therein parallel and adjacent to a given surface thereof, to charged particle radiation over said surface whereby said particles penetrate the body toward said junction; applying electrical bias to the PN junction in the reverse direction to establish an electrical field about the junction and define in the body a depletion region of sufficient width to capture substantially all of the ionization produced in said body; and detecting current pulses appearing across the PN junction corresponding to the energy contained in each radiation particle penetrating said surface toward said junction.

References Cited in the file of this patent

UNITED STATES PATENTS

| | | |
|---|---|---|
| 2,644,852 | Dunlap | July 7, 1953 |
| 2,670,441 | McKay | Feb. 23, 1954 |
| 2,885,562 | Marinace | May 5, 1959 |
| 2,886,739 | Mathews et al. | May 12, 1959 |
| 2,914,665 | Linder | Nov. 24, 1959 |
| 2,942,110 | Lehovec | June 21, 1960 |
| 2,988,639 | Welker et al. | June 13, 1961 |
| 2,991,366 | Salzberg | July 4, 1961 |